United States Patent [19]

Brücher

[11] Patent Number: 4,997,211
[45] Date of Patent: Mar. 5, 1991

[54] CONNECTION OF AN UNCOOLED PIPE WITH A COOLED PIPE

[75] Inventor: Peter Brücher, Berlin, Fed. Rep. of Germany

[73] Assignee: Borsig GmbH, Berlin, Fed. Rep. of Germany

[21] Appl. No.: 502,566

[22] Filed: Mar. 30, 1990

[30] Foreign Application Priority Data

Apr. 1, 1989 [DE] Fed. Rep. of Germany ....... 3910630

[51] Int. Cl.$^5$ .............................................. F16L 53/00
[52] U.S. Cl. ........................................ 285/41; 285/47; 285/286; 285/906
[58] Field of Search .................... 285/41, 47, 286, 906

[56] References Cited

U.S. PATENT DOCUMENTS

| 3,488,067 | 1/1970 | Sommer | 285/41 |
| 3,705,734 | 12/1972 | Rajokovics | 285/41 |
| 4,154,446 | 5/1979 | Usry | 285/41 X |
| 4,234,215 | 11/1980 | Wilson | 285/41 |
| 4,576,404 | 3/1986 | Weber | 285/41 |

Primary Examiner—Dave W. Arola
Attorney, Agent, or Firm—Max Fogiel

[57] ABSTRACT

The end of the uncooled pipe (1) is forked in cross-section, creating an inner and an outer section (5 and 6). The outer section is secure to a cooled pipe (2) and the inner section extends into the cooled pipe with radial and axial play. The annular gap (13) between the inner and outer sections is occupied by a heat-insulating material.

6 Claims, 2 Drawing Sheets

CONNECTION OF AN UNCOOLED PIPE WITH A COOLED PIPE

The invention concerns a joint between a hot, uncooled pipe and a cooled pipe.

The walls of the pipes that communicate through a joint of this type differ in temperature. The difference causes the pipes to expand to different extents, resulting in impermissible stress at the joint. It can also be necessary to make the pipes from materials with different coefficients of thermal expansion, further increasing the stress.

The object of the present invention is to provide a joint between a hot, uncooled pipe and a cooled pipe such that the thermal stress will be as low as possible.

Since the temperatures of the walls are almost equal in the vicinity of the joint, there will be no thermal stress.

Figure 1:
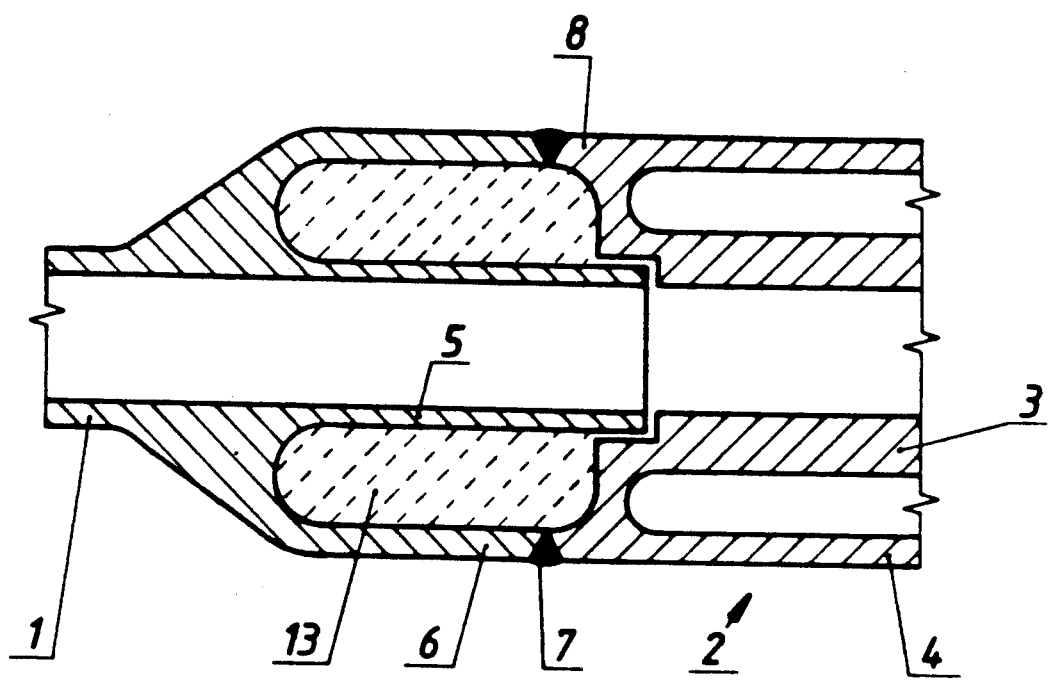
Figure 2:
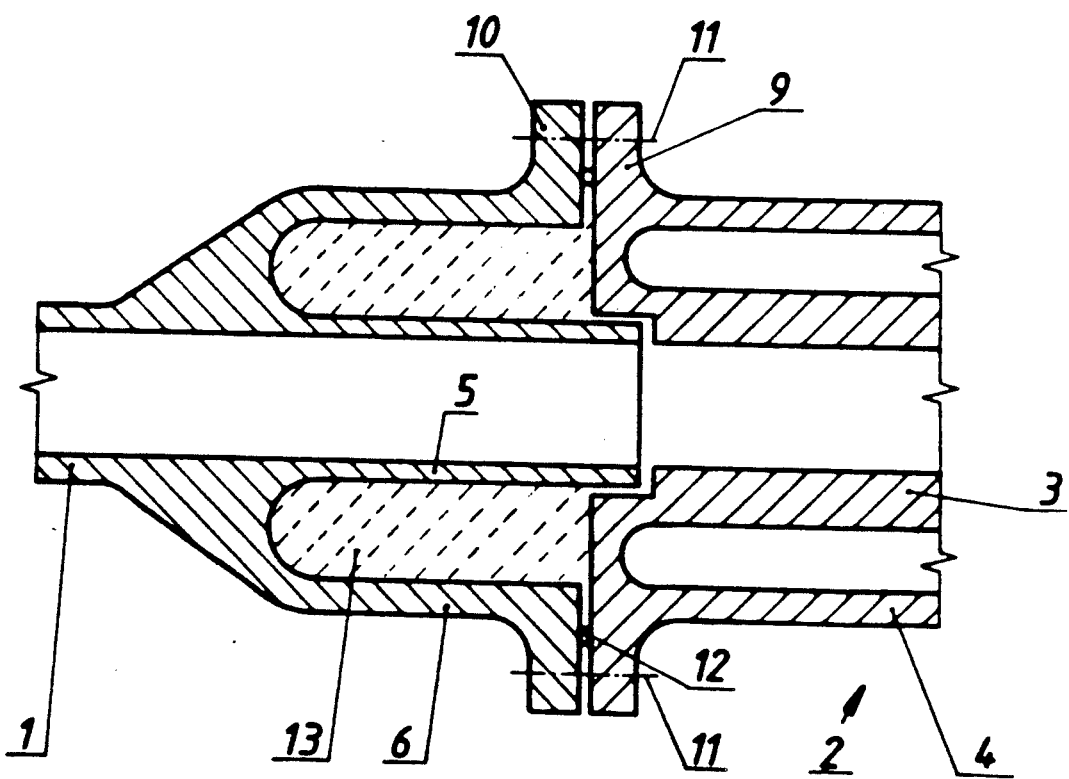
Figure 3:
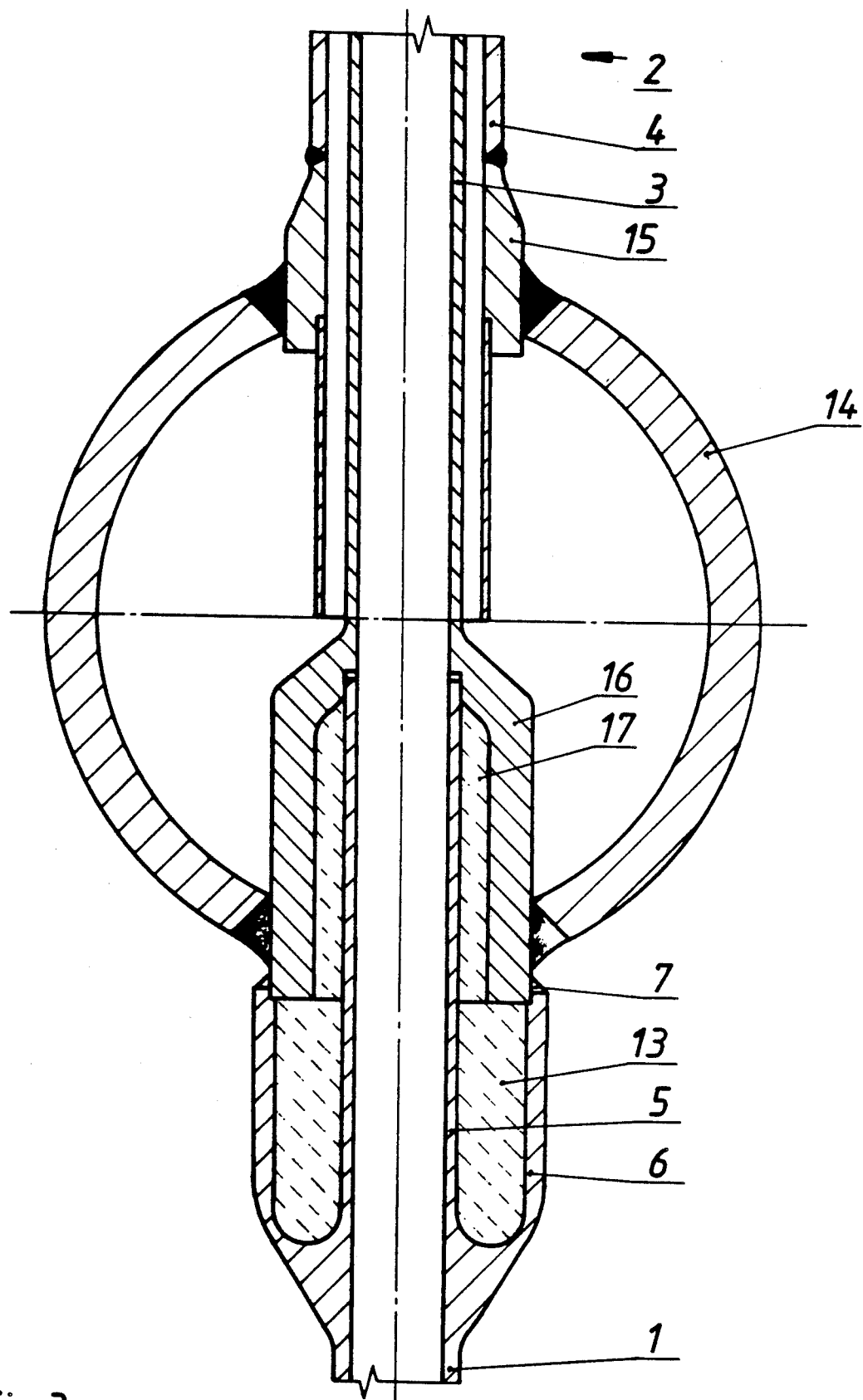

Several embodiments of the invention will now be described with reference to the drawing, wherein FIG. 1 is a longitudinal section through a joint between two pipes, FIG. 2 illustrates another embodiment of the joint, and FIG. 3 is a longitudinal section through another embodiment.

Hot gas flows through an uncooled pipe 1 that communicates with a cooled pipe 2. Pipes 1 and 2 are aligned and preferably have the same inside diameter. Cooled pipe 2 is double-walled and consists of a core 3 and a jacket 4. A coolant, evaporating water for example, flows through the annular gap between core 3 and jacket 4.

To allow uncooled pipe 1 to be connected to cooled pipe 2 without stress, the cross-section of the end of uncooled pipe 1 that is in contact with cooled pipe 2 is forked, creating an inner section 5 and an outer section 6 that communicate at the face.

Outer section 6 is secured stationary to the jacket 4 of cooled pipe 2. The rigid joint in the embodiment illustrated in FIG. 1 is welded, as indicated by an annular seam 7. There is for this purpose an annular extension 8 on jacket 4 that is as thick as the wall of outer section 6. Outer section 6 and jacket 4 each accordingly have an annular flange 9 and 10. The flanges are secured together by screws 11, and there is a seal 12 between them.

The inner section 5 of uncooled pipe 1 extends into the core 3 of cooled pipe 2 with radial and axial play, exaggerated in FIGS. 1 and 2, left between them to accommodate any thermal expansion of uncooled pipe 1 in relation to cooled pipe 2.

The annular gap 13 between the inner and outer sections 5 and 6 of uncooled pipe 1 is occupied by a heat-insulating material.

When coolant is flowing between the core 3 and the jacket 4 of cooled pipe 2, the temperature of the wall of the jacket will almost equal that of the coolant. Core 3, which accommodates the hot gas entering from uncooled pipe 1, is effectively cooled externally by the coolant. The result is a wall temperature definitely below the temperature of the gas and even in the vicinity of that of the coolant. The temperature at the inner surface of uncooled pipe 1 and of inner section 5 is approximately the same as that of the hot gas. The temperature of the wall of outer section 6 will, due to the intermediate layer of heat-insulating material in annular gap 13, be lower. Depending on the temperature of the hot gas and of the coolant, the thickness of the heat-insulating material and the length of the forked end of uncooled pipe 1 can be established to ensure that the temperatures of the walls in the vicinity of the joint, at seam 7 for example, will be almost equal. The extensive uniformity of temperature in turn prevents thermal stress.

The joint illustrated in FIGS. 1 and 2 is preferred for horizontal pipes and the one illustrated in FIG. 3 for heat exchangers. The latter represents an example of how the invention can be employed, with uncooled pipe 1 constituting a pipe from a furnace for cracking gas. Each such pipe communicates with a pipe 2 that acts as a cool pipe in a single-pipe heat exchanger for cooling the cracked gas.

The jacket 4 of cooled pipe 2 is welded by way of a spacer 15 into a collecting pipe 14 that is supplied with coolant for several parallel pipes 2. Core 3 has an expansion 16 that is welded into collecting pipe 14 such that core 3 will in conjunction with expansion 16 extend through collecting pipe 14, leaving the annular gap between core 3 and jacket 4 open to collecting pipe 14.

Outside collecting pipe 14, expansion 16 communicates with the outer section 6 of uncooled pipe 1 by way of seam 7. Inner section 5 extends into expansion 16, leaving an annular gap 17 radially between inner section 5 and expansion 16. Annular gap 17 is, like the annular gap 13 between inner and outer sections 5 and 6, occupied by a heat-insulating material. There is radial and axial play between the end of inner section 5 and expansion 16 to compensate for heat expansion.

I claim:

1. A joint between a hot uncooled pipe and a cooled pipe for avoiding thermal stress comprising: a hot uncooled pipe having in longitudinal cross-section a fork-shaped end forming an inner section and an outer section at said end of said uncooled pipe; said end having an end face, said inner section communicating with said outer section at said end face; a cooled pipe, said inner section extending into said cooled pipe with radial and axial play between said inner section and said cooled pipe; said inner section and said outer section having an annular gap therebetween; heat-insulating material in said annular gap; and means for securing said outer section of said fork-shaped end to said cooled pipe, and said joint being so constructed and arranged that the operating temperature of said outer section of said fork-shaped end and said cooled pipe in the area of said securing means is substantially uniform thereby avoiding said thermal stress, said uncooled pipe being aligned with said cooled pipe and said pipes being positioned coaxially one behind the other.

2. A joint as defined in claim 1, wherein said cooled pipe has an end portion with outer diameter substantially grater than the outside diameter of a part of said cooled pipe adjacent to said end portion; said securing means comprising weld means securing said end portion of said cooled pipe to said outer section of said uncooled pipe; said end portion of said cooled pipe surrounding said inner section of said uncooled pipe with an annular gap between said end portion and said inner section; and heat-insulating material in said annular gap.

3. A joint as defined in claim 1, wherein said cooled-pipe has a double wall forming a core and a jacket; and a coolant flowing through an annular gap between said core and said jacket.

4. A joint as defined in claim 3, wherein said securing means comprises a flange on said outer section and a flange on said jacket; means for fastening said flanges together; and a seal between said flanges.

5. A joint as defined in claim 1, wherein said securing means comprises a welded seam, said heat-insulating material having a thickness and said fork-shaped end having a length for producing and substantially uniform temperatures in the vicinity of said joint and at said welded seam for avoiding said thermal stress.

6. A joint between a hot uncooled pipe and a cooled pipe for avoiding thermal stress comprising: a hot uncooled pipe having in longitudinal cross-section a fork-shaped end forming an inner section and an outer section at said end of said uncooled pipe; said end having an end face, said inner section communicating with said outer section at said end face; a cooled pipe, said inner section extending into said cooled pipe with radial and axial play between said inner section and said cooled pipe; said inner section and said outer section having an annular gap therebetween; heat-insulating material in said annular gap; and means for securing said outer section of said fork-shaped end to said cooled pipe; said uncooled pipe being aligned with said cooled pipe and said pipes being positioned coaxially one behind the other; said cooled pipe having a double wall forming a core and a jacket; a coolant flowing through an annular gap between said core and said jacket; said securing means comprising a welded seam, said heat-insulating material having a thickness and said fork-shaped end having a length for producing substantially equal temperatures in walls of said joint at said welded seam for avoiding thermal stress.

* * * * *